United States Patent [19]

Sydor

[11] Patent Number: 5,432,524
[45] Date of Patent: Jul. 11, 1995

[54] DRIVE ARRANGEMENT FOR MECHANICALLY-STEERED ANTENNAS

[75] Inventor: John T. Sydor, Ottawa, Canada

[73] Assignee: Her Majesty the Queen in right of Canada, as represented by the Minister of Communications, Ottawa, Canada

[21] Appl. No.: 24,461

[22] Filed: Mar. 1, 1993

[51] Int. Cl.⁶ .............................................. H01Q 3/08
[52] U.S. Cl. ................... 343/765; 343/766; 343/882
[58] Field of Search ............... 343/757, 758, 759, 761, 343/762, 763, 765, 766, 882; H01Q 3/00, 3/12

[56] References Cited

U.S. PATENT DOCUMENTS

| | | | |
|---|---|---|---|
| 3,407,404 | 10/1968 | Cook et al. | 343/765 |
| 3,987,451 | 10/1976 | Peterson | 343/765 |
| 4,295,621 | 10/1981 | Siryj | 343/765 |
| 4,538,155 | 8/1985 | Stewart | 343/715 |
| 4,636,802 | 1/1987 | Middleton, Jr. | 343/895 |
| 4,690,473 | 9/1987 | Chung | 439/1 |
| 4,887,091 | 12/1989 | Yamada | 343/714 |
| 5,022,861 | 6/1991 | Aoto | 439/13 |
| 5,025,262 | 6/1991 | Abdelrazik et al. | 343/705 |

Primary Examiner—Michael C. Wimer
Attorney, Agent, or Firm—Thomas Adams

[57] ABSTRACT

A mechanically steerable antenna suitable for mobile earth stations of satellite communication systems comprises a support member mounted upon a base member and an active antenna element or array of elements mounted upon the support member. The antenna element or array of elements is rotatable about its boresight relative to the support member. The support member itself is rotatable in azimuth relative to the base member. The rotation axis of the antenna element or array of elements and the rotation axis of the support member are mutually inclined by a predetermined angle corresponding to the mean elevation angle of the satellite. The antenna includes drive means for rotating the support member relative to the base member, and a flexible coupling interconnects the base member and the antenna element. The arrangement is such that, as the support member rotates relative to the base member, the flexible coupling transmits torsional forces to rotate the antenna element or array of elements oppositely relative to the support member.

10 Claims, 3 Drawing Sheets

5,432,524

DRIVE ARRANGEMENT FOR MECHANICALLY-STEERED ANTENNAS

FIELD OF THE INVENTION

This invention relates to antennas and is especially concerned with drive arrangements for mechanically-steerable antennas. The invention is especially applicable to antennas for mobile terminals for receiving signals broadcast by satellites.

BACKGROUND

In order to maintain adequate reception, it is desirable for a vehicle-mounted antenna to include a directional antenna element or array of elements which can be rotated relative to the vehicle so as to track the satellite as the orientation of the vehicle changes. It is also desirable for the antenna to be small and light enough to be mounted on either a mast or the back window of an automobile. Known antennas of this kind comprise a support member which is rotatably mounted to the vehicle and carries an antenna element which may be pivotable relative to the support member to alter its tilt angle. U.S. Pat. No. 4,887,091 (Yamada) issued December 1989, discloses such an antenna and mentions the possibility that the signal cable connected between the antenna element and the vehicle would be easily damaged by repeated twisting resulting from rotation of the antenna. Yamada overcomes this problem by means of a rotary connector mounted upon a carrier for the antenna element. A coaxial signal cable passes through a hole in the base plate or support member and into the rotary connector. A set of gears interconnect the rotary connector with an internal ring gear provided inside the support or base plate. As the antenna rotates, the gears rotate the rotary connector in synchronism with it. The rotary connector must be precision engineered so as to make reliable low impedance connection while occupying little space. As a result, such rotary connectors are very expensive to make. Since the rotary connector will incur greater losses than a direct connection, the antenna element will have to be larger so as to increase its gain and compensate for the increased loss. Moreover, the gear drive would increase manufacturing costs, complicate construction, reduce reliability, and inhibit reduction of size. In view of these disadvantages, such an antenna is not entirely satisfactory.

SUMMARY OF THE INVENTION

A mechanically steerable antenna comprises a support member mounted upon a base member and an active antenna element mounted upon the support member. The antenna element is rotatable relative to the support member about a first axis of rotation and the support member is rotatable relative to the base member about a second axis of rotation, the first axis and second axis being mutually inclined by a predetermined angle. The antenna includes drive means for rotating the support member relative to the base member, and a flexible coupling interconnects the base member and the antenna element. The arrangement is such that, as the support member rotates relative to the base member, the flexible coupling inhibits rotation of the antenna element relative to the base member thereby causing relative rotation of the antenna element and the support member.

In preferred embodiments of the invention, a first bearing couples the antenna element to the support member and a second bearing couples the support member to the base member. The flexible coupling is tubular and extends between respective inner components of the first and second bearings. A feedline in the form of a coaxial cable is connected at one end to a radiator element of the antenna element, passes through the first bearing, flexible coupling and second bearing, and is connected at its other end to signal circuitry.

The antenna element may comprise a ground plane with a central recess, in which case the first bearing may be accommodated, at least partially, by the recess thereby affording improved stability and reduced occupied volume.

Various objects, features, aspects and advantages of the present invention will become more apparent from the following detailed description, in conjunction with the accompanying drawings, of preferred embodiments of the invention, which are described by way of example only:

DESCRIPTION OF PREFERRED EMBODIMENTS

Figure 1:
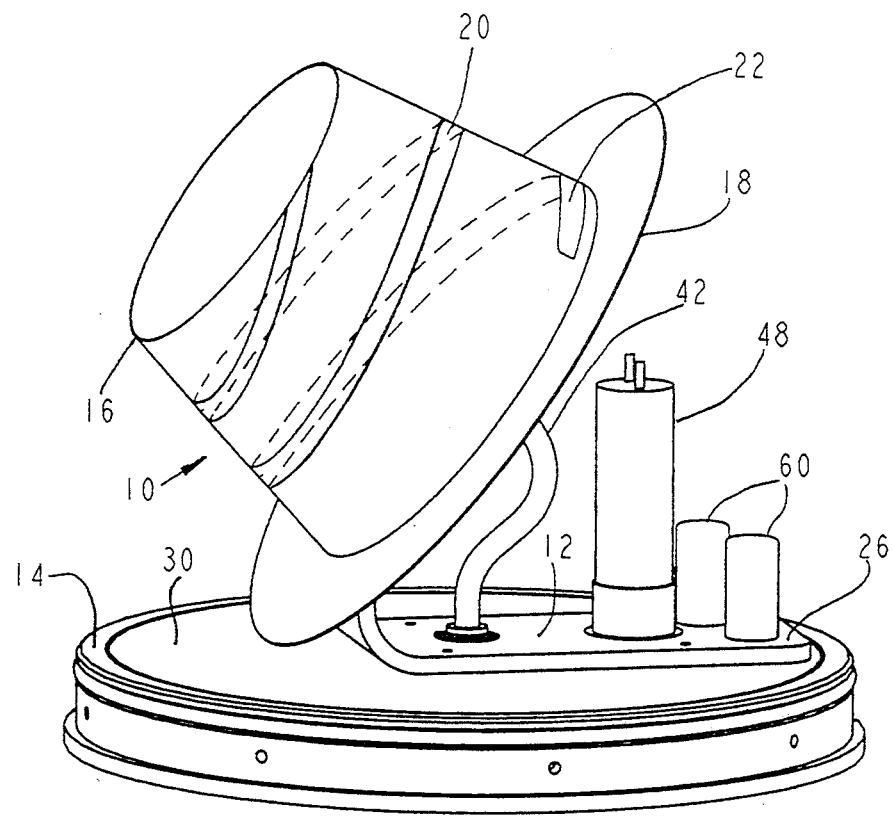
FIG. 1 is a pictorial view of a first antenna embodying the invention.
Figure 2:
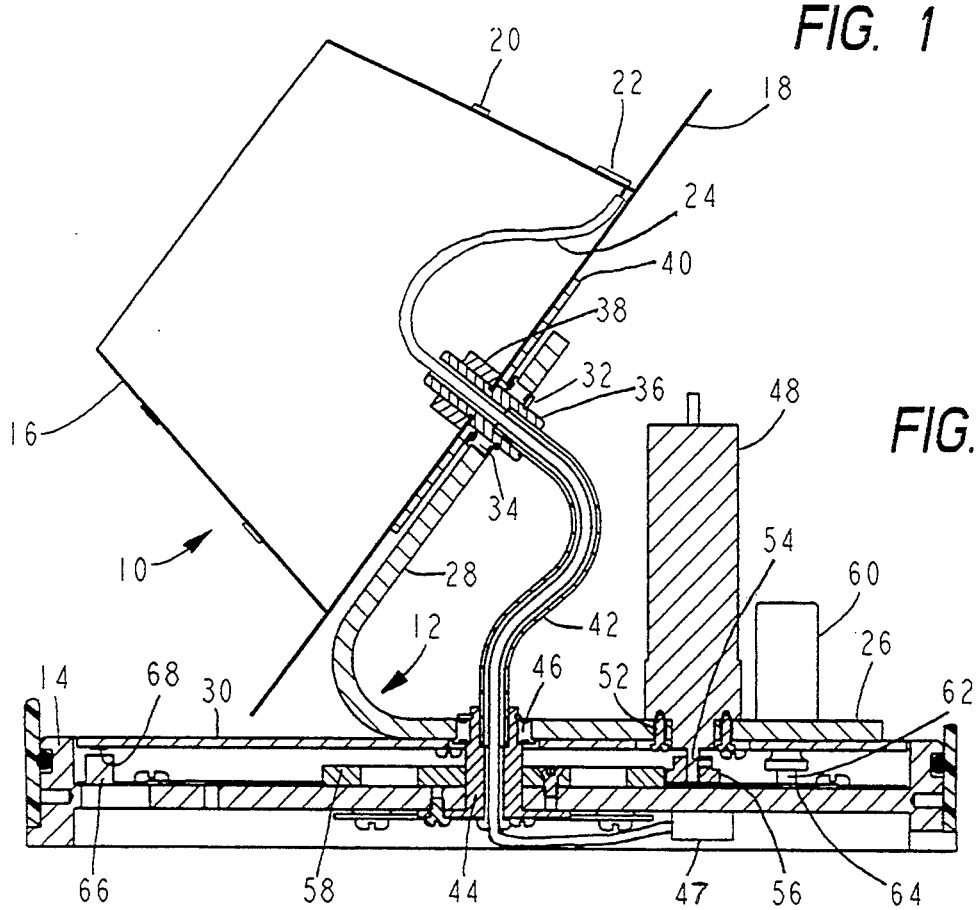
FIG. 2 is a longitudinal cross section of the antenna of FIG. 1.

Referring first to FIGS. 1 and 2, a mechanically steerable antenna for mounting upon a vehicle for communication via satellite of mobile radio communications, telephony, data, direct audio broadcasts, or other such signals, is shown in FIG. 1 with its radome removed and in FIG. 2 with its radome cut away. The antenna comprises an active antenna element 10 rotatably mounted upon a support member 12 which is itself rotatably mounted upon a base member 14. The antenna element 10 comprises a frustum or truncated cone 16 of flexible printed circuit board material with its base bonded to a circular ground plane 18 made of suitable conductive metal such as copper, aluminium, magnesium and so on. The ground plane 18 may conveniently be formed of printed circuit board material also.

Figure 7:
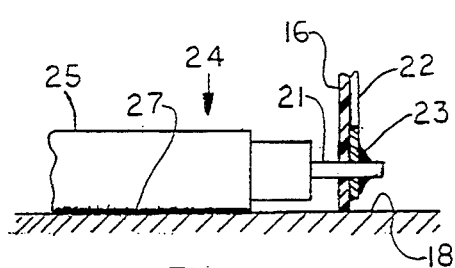
FIG. 7 is a cross-sectional view of the connection between the matching transformer and a feed cable.

A short, helical copper conductor 20 printed upon the conical printed circuit board substrate 16 comprises the radiator or receptor element of the antenna element 10. The helical conductor 20 terminates at its maximum diameter end in an impedance matching transformer 22. The matching transformer 22 comprises a wedge shaped continuation of the end portion of the conductor 20. The lower edge 140 of the matching transformer 22 is positioned adjacent the ground plane 18. The combined length of the matching transformer 22 and the helical conductor 20 is about one and three quarters turns. As shown in FIG. 7, the core 21 of a coaxial feed cable 24 extends through aligned holes in the substrate 16 and matching transformer 22 and is soldered to the latter as indicated at 23. The outer shield 25 of the cable 24 is soldered to the ground plane 18 as indicated at 27. The other end of the cable 24 is connected to circuitry in base member 14, as will be described later.

Referring again to FIG. 2, the support member 12 comprises two arms 26 and 28. Arm 26 is mounted upon a platform member 30 which is rotatably mounted upon the base member 14. A bearing 32 is located in a hole 34 in the upper portion of arm 28. A tubular spindle 36 has one end fitted into the bearing 32 and its other end is screwthreaded and protrudes upwards from the arm 28. The antenna element 10 is mounted upon the tubular spindle 36, which extends through a hole in the centre of the ground plane 18, and is secured by a fastening nut 38. The ground plane 18 is reinforced in the vicinity of the spindle 36 by means of a circular boss 40 formed integrally with the ground plane. The spindle 36 and the ground plane 18 could, of course, be formed integrally, for example by die casting.

A flexible coupling in the form of a cylindrical spring 42 connects the antenna element 10 to base member 14. The cylindrical spring 42 has one end fitted tightly into the lower end of spindle 36. Its other end is fitted tightly into the upper end of a spigot 44 which extends through the platform member 30 and is fixed, non-rotatably, to the base member 14. The platform member 30, and arm 26 of support member 12, are rotatably mounted upon the base member 14 by means of a bearing 46. The inner ring of bearing 46 fits around the upwardly protruding end of spigot 44 and is supported by a shoulder. The outer ring of bearing 46 is secured in a hole in arm 26.

The coaxial feed cable 24 extends through cylindrical spring 42, entering it via the spindle 36 and leaving it via the spigot 44, to connect the matching transformer 22 to a diplexer 47 mounted beneath the base member 14. The diplexer 47 will be connected to other circuitry (not shown) of the transmitter or receiver which may or may not be mounted upon the base member 14. This additional circuitry will be of conventional design and so will not be described further.

A drive motor 48 mounted upon the support member 12 serves to rotate the support member 12 relative to base member 14. Drive motor 48 is attached to the support member 12 by means of screws 52 and its drive shaft 54 extends through the support member 12 and platform member 30. A pinion 56 carried by drive shaft 54 engages a ring gear 58 fixed to the base member 14. As the pinion 56 rotates, the drive motor 24 and the support member 12 rotate relative to base member 14. Two brush assemblies 60 are mounted upon the support member 12 so that their carbon brushes 62 engage slip rings 64 on the upper surface of base member 14 to pick up motor drive current (DC) as the support member 12 rotates.

The position of the support member 12, and hence the antenna element 10, relative to the base member 14, at any instant, is measured by an optical encoder 66 which is mounted upon the base member 14. The optical encoder 66 reads patterns 68 on the platform member 30 and supplies corresponding position signals to the control circuitry (not shown).

As the support member 12 rotates relative to the base member 14 about the vertical rotation axis of bearing 46, the flexible coupling 26 will prevent rotation of the antenna element 10 relative to the base member 14. As a result, the antenna element 10 will rotate oppositely relative to the support member 12 about the rotation axis of bearing 32, which is also the boresight of the antenna element 10. Hence, as the antenna element 10 rotates about the boresight axis, it will sweep an arc around the rotation axis of bearing 46. At the same time, the cylindrical spring 42 will flex relative to its own cylindrical axis—although it does not, itself, rotate about that axis. Likewise, the coaxial cable 24 will flex as the antenna element 10 rotates. It should be appreciated that the flexible coupling 42 and coaxial cable 24 may experience some twisting as torsional forces are built up, but these will be released as the antenna element rotates so that neither the flexible coupling nor the coaxial cable is permanently twisted. The coaxial cable 24 must be able to tolerate repeated flexing and some twisting. A cable employing a laminated Teflon (Trade Mark) dielectric and conductors of wrapped silver foil and highly stranded silver coated copper has been found to be satisfactory. Suitable cables are marketed by Goretex Cables Inc. as Gore Type 4M and Gore Type 4T.

The radiation pattern of antenna element 10 is symmetrical about its boresight, so rotation of the antenna element 10 about the boresight axis does not have any significant effect upon the gain of the antenna. In use, the base member 14 will usually be mounted generally horizontally and the platform member 30 will be rotated about the vertical axis. Support arm 28 is inclined relative to arm 26 so that the angle between the rotation axis or boresight of the antenna element 10 and the platform member 30 is substantially equal to the mean elevation angle of the satellite with which the antenna is to communicate signals. As an example, where the antenna is to be used in North America with MSAT satellites, the mean elevation angle would be approximately 40°.

Figure 3:
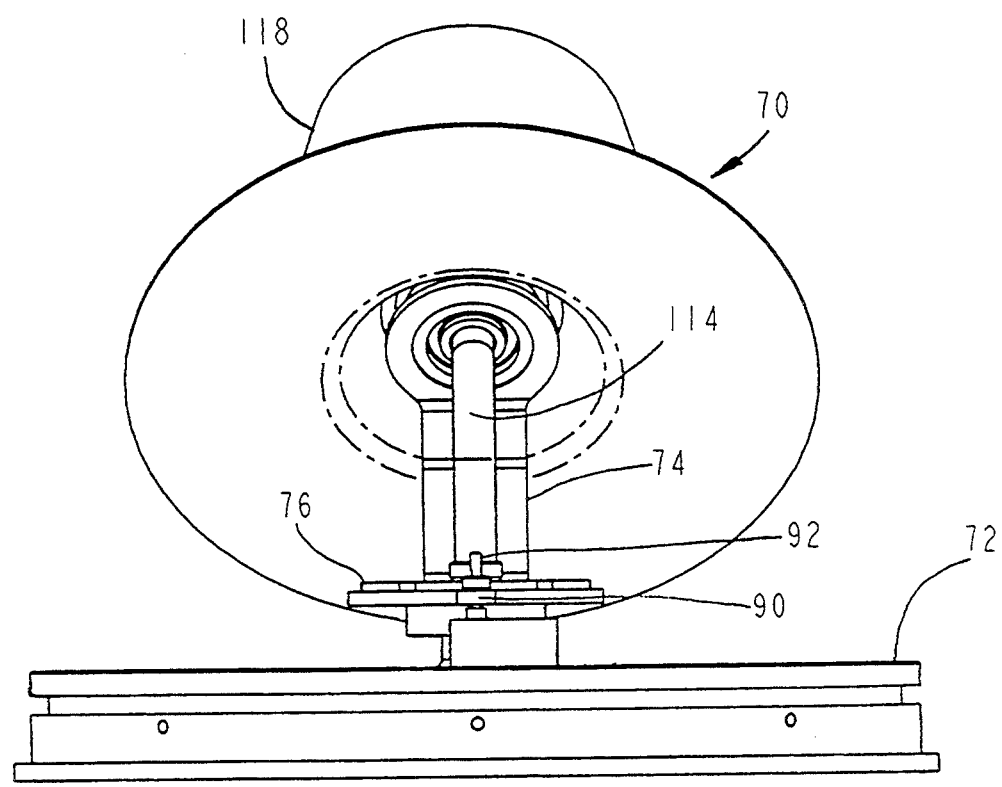
FIG. 3 is an elevation of a second embodiment of the invention.
Figure 4:
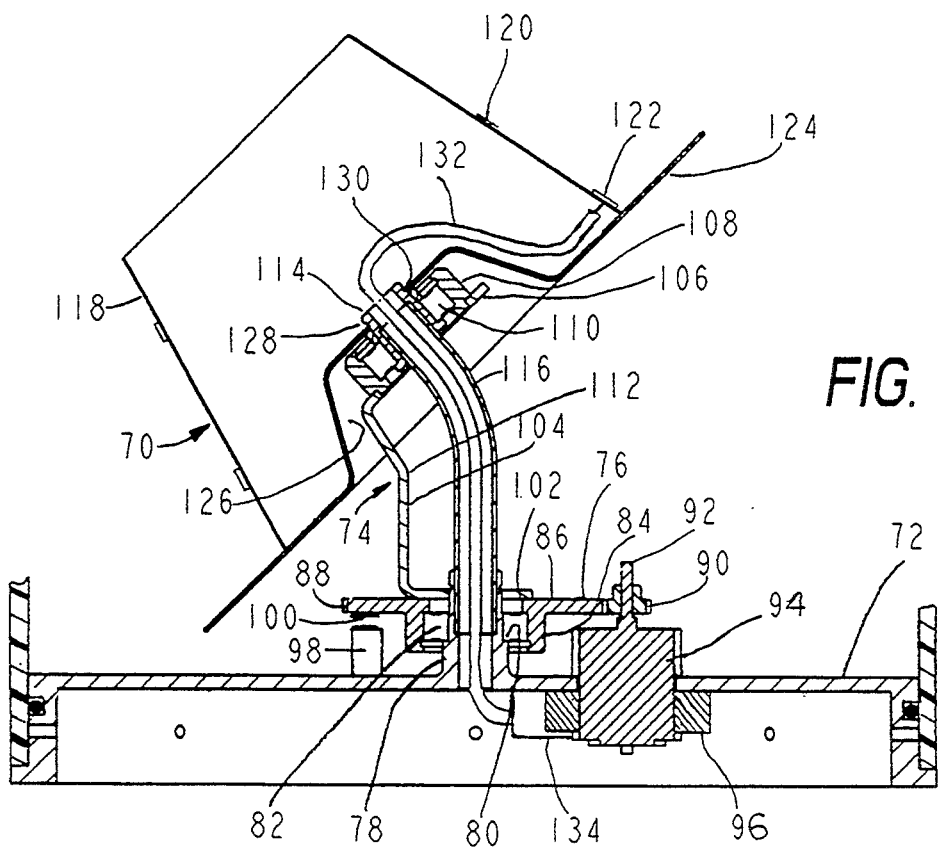
FIG. 4 is a longitudinal cross section of the antenna of FIG. 3.

A second, even more compact embodiment of the invention is illustrated in FIGS. 3 and 4. The antenna shown in FIGS. 3 and 4 is generally similar to that described above in that it comprises an active antenna element 70 mounted upon a base member 72 by means of a cranked support arm 74 carried by a rotatable platform member 76. A spigot 78 projects upwards from the centre of the base member 72 and has an external shoulder 80. A bearing 82 mounted upon the spigot 78, resting upon the shoulder 80, supports the platform member 76. The bearing 82 is accommodated in a recess in a cylindrical boss 84 of platform member 76. The boss 84 carries a circular flange 86 which has a peripheral ring gear 88. The ring gear 88 engages a drive pinion 90 carried by the drive shaft 92 of a drive motor 94 mounted upon the base member 72 by a bracket 96. An optical encoder 98 reads patterns 100 on the underside of platform 76 to provide signals representing the position of the platform member 76, and hence the antenna element 10, at any instant. These signals are supplied to a control unit (not shown) for the drive motor 94.

The support arm 74 has a first portion 102 attached to the platform 76 by screws or any other suitable means (not shown), an upstanding portion 104, and an upper portion 106. A cylindrical boss 108 attached to the upper portion 106 houses a bearing 110. The upstanding portion 104 is cranked at 112 so that the upper portion 106 subtends an angle of approximately 50 degrees to the plane of the platform member 76. As a result, the rotation axis of the bearing 110, and hence the boresight of antenna element 70, is at an angle of approximately 40 degrees to the plane of the platform member 30 which, in operation, will be horizontal. Hence, the boresight is set to the elevation angle of the satellite, as previously described.

A tubular thimble member 114 extends through the bearing 110 and is a close fit to its inner ring. One end of a tubular flexible spring member 116 extends into, and is a tight fit in, the lowermost end of the thimble member 114. The other end of the flexible spring member 116 is a tight fit in the mouth of spigot 78. Hence, the flexible spring member 116 couples the thimble member 114, and with it the antenna element 70, non-rotatably to the base member 14.

The antenna element 70 is similar to antenna element 10 shown in FIG. 1 in that it comprises a truncated cone 118 of flexible printed circuit board material and a printed copper conductor 120 terminating in a printed copper matching transformer 122. Its ground plane 124, however, differs in that it has a central recessed portion 126. The end portion of thimble member 114 extends through a hole 128 in the middle of recessed portion 126. A circlip 130 on the protruding end of thimble member 114 secures the antenna element 10 to the thimble member 114.

As before, a feed line in the form of a coaxial cable 132 has its inner conductor connected to the matching impedance and its outer shield soldered to the adjacent surface of the ground plane 124. The cable 132 extends through the thimble 114, flexible spring member 116 and spigot 78 to emerge within the base member 72 where it is connected to a diplexer 134. The diplexer 134 couples the signals from antenna element 10 to the receiver circuitry (not shown).

When the antenna is in use, the drive motor 94 rotates the platform member 76 about the vertical rotation axis of bearing 82. As in the embodiment of FIG. 1, flexible spring member 116 will prevent rotation of the antenna element 10 relative to the base member 72, causing it to rotate about its boresight axis relative to platform member 76. Because the recessed portion 126 extends around and shrouds the upper portion 106 of support member 74 and the bearing 110 and its housing 108, the flexible spring member 116 and cable 132 can be straighter, which reduces wear and tear upon them due to flexing, further improving reliability and durability. Moreover, recessing the ground plane to accommodate the bearing and its housing further reduces the size of the antenna, without significantly affecting its electromagnetic performance. The arrangement also gives better stability when the antenna is subjected to inertial forces.

The mechanical steering arrangements shown in FIGS. 1-4 may be used with many kinds of antenna element, for example circular, square, pentagonal, microstrip patches or dielectrically loaded Yagi antenna elements. The particular active antenna element shown in FIGS. 1-4 is preferred because it is compact, yet provides a symmetrical radiation pattern with relatively high gain. With careful selection of its dimensions, such an antenna element may be so efficient that the performance requirements for MSAT can be met with a single antenna, rather than different antennas for different latitudes as envisaged by the MSAT specifications.

Figure 5:
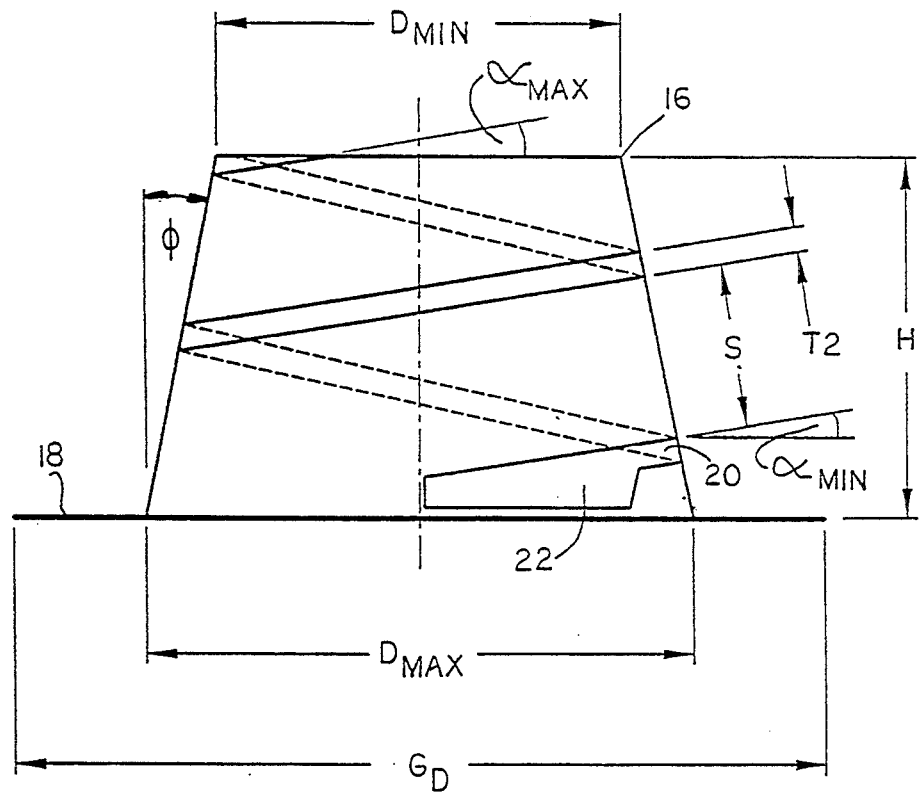
FIG. 5 is a view of the radiator element and ground plane of the antenna elements used in the embodiments of FIGS. 1 and 4.

Referring now to FIG. 5, the critical dimensions of the antenna element 10/70 are identified as follows:

| Maximum diameter of substrate | $D_{MAx}$ |
| Minimum diameter of substrate | $D_{MIN}$ |
| Height of substrate | H |
| Diameter of ground plane | $G_D$ |
| Width of helical conductor | T2 |
| Spacing between turns of helix | S |
| Cone angle | $\phi$ |
| Pitch angle | $\alpha_{MIN} \leq \alpha \leq \alpha_{MAX}$ |

The length of the radiator element conductor 20 is selected as the minimum which will allow the establishment of a surface wave on the surface of the radiator element conductor 20. As soon as a surface wave is established, the antenna achieves an end-fire radiation pattern with a beam which is broad and has enough gain to meet the MSAT Medium Gain Antenna requirements for North and South coverage.

An antenna element 10/70 for use with a mobile earth terminal of MSAT, operating over a frequency range of 1530 MHz. to 1660 MHz., can meet MSAT performance requirements for mobile earth terminal G/T and EIRP over the entire range of latitudes when the dimensions (FIG. 5) are selected such that:

$D_{MIN}$ is about equal to $\lambda/3$; where $\lambda$ is the mean operational wavelength;

$D_{MAX}$ is just less than $\lambda/2$, specifically $0.46\lambda$

Ground plane diameter $G_D$ is about $2\lambda/3$;

Winding spacing S is such that pitch angle $\alpha$, defined as Arctan $(S/\pi D)$, varies uniformly over the length of the conductor between a minimum $\alpha_{MIN}$ of 6 degrees adjacent the base and a maximum $\alpha_{MAX}$ of 8 degrees adjacent the vertex;

Cone angle $\phi$ is 10 degrees;

The conductor 20/120 and matching transformer 22/122 comprise one and three quarter turns of the helix.

The resulting antenna can be housed in a bullet shaped radome about 14 cms. diameter and about 14 cms. high and is so light that it can be mounted onto the roof of an automobile using magnets or to the rear window using adhesives.

Figure 6:
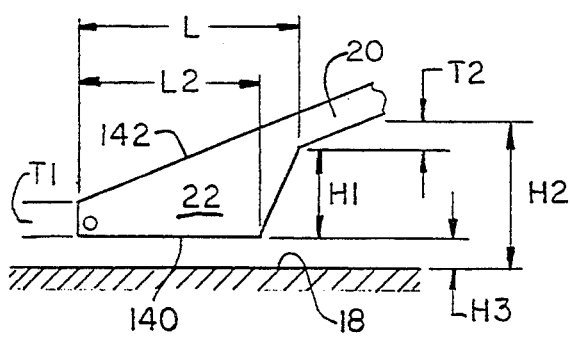
FIG. 6 is a detail view of a printed circuit matching transformer which forms part of the antenna element.

Frusto-conical helical antenna elements have a complex impedance which varies as a function of frequency and as a function of ground plane size. For the specific embodiment described above, the impedance ranged from 55-j60 ohms at 1500 MHz. to 90-j40 ohms at 1650 Mhz. The matching transformer 22/120 is designed to match the characteristic impedance of the antenna element with a coaxial or microstrip feed line 24/28 having an impedance of 50 ohms. Matching transformer 22 is illustrated in more detail in FIGS. 6 and 7. (Matching transformer 122 is identical). The matching transformer 22 is generally wedge shaped with its broader end connected to the conductor 20. One major edge 140 of the matching transformer 22 extends parallel, and in close proximity to, the ground plane 18. The opposite edge 142 diverges at an angle approximately equal to the pitch angle of the adjacent end of the conductor 20, i.e. the matching transformer is tapered. The shape and positioning of the matching transformer provides distributed capacitance to ground, the tapered shape provides varying inductance along its length. As a result, the matching impedance accurately matches the resistive impedance of the cable 24 to the complex impedance of the radiator element 20. The length L, minor width T1, major width T3 and the width H3 of the capacitive gap are critical. A change of more than about 5 percent in the parameters could have an intolerable effect upon return loss and matching performance. For the antenna element 10 whose dimensions are given above, adequate matching was obtained when the dimensions of the matching transformer shown in FIG. 6, were: width at the narrow T1=6 mm.; width at the broader end, including the conductor, H2=9 mm.; width at broad end minus the conductor, H1=5 mm.; overall length L =42 mm.; length of lower edge 140, L2=39 mm.; conductor width T2=4 mm.; and the spacing between edge 140 and the ground plane, H3=1 mm.

Figure 8:
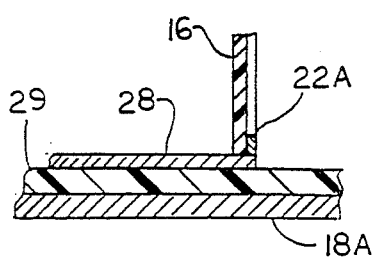
FIG. 8 is a side sectional view of an alternative arrangement in which the printed circuit matching transformer is connected to a microstrip conductor.
Figure 9:
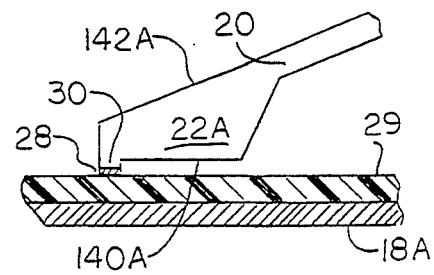
FIG. 9 is a front sectional view of the matching transformer of FIG. 8.

FIGS. 8 and 9 illustrate, as an alternative, connection of the matching transformer 22 to a microstrip transmission line rather than a coaxial cable. The microstrip transmission line comprises a microstrip conductor 28 along the surface of a dielectric plate 29. The ground plane 18A is provided on the opposite surface of the dielectric plate 29. At one end of the edge 140A of matching transformer 22A, a small tab 30 protrudes towards the microstrip conductor 28 and is soldered to it. The presence of the dielectric material 29 between the matching transformer 22 and the ground plane 18A alters the characteristics as compared with the matching transformer 22 of FIG. 6. The changes can be compensated by increasing the overall length of the conductor 20 to ensure that the impedance matching is correct.

Forming the matching impedance integrally with the radiator element using printed circuit techniques allows the dimensions can be reproduced accurately yet economically.

An advantage of a matching transformer formed directly onto the substrate is that it is less susceptible to variation caused by the effects of vibration and inertia.

For further details of the antenna element 10/70 and the matching transformer 22/122 the reader is directed to my copending U.S. patent application Ser. No. (08/024,463), filed concurrently herewith, the entire contents of which are incorporated herein by reference.

Various modifications are possible within the scope of the present invention. Thus, the torsional coupling arrangement could be modified quite easily to allow the elevation angle of the boresight to be changed. For example, the lower portion 36 and upstanding portion 38 could be separate parts coupled together by means of a pivot. The relative inclination of the upstanding portion 38 could then be adjusted by a suitable solenoid or motor unit controlled by the receiver to adjust the elevation angle automatically. Adjustment of the elevation angle in this way would permit the gain of the antenna to be optimized and permit the use of antenna elements which have lower intrinsic gain than that described herein.

It will be appreciated that automatic adjustment of the elevation angle could be coordinated with the rotation of support member about the vertical axis so as to compensate automatically for any lack of symmetry of the antenna radiation pattern.

Although the antenna element means 10/70 of the antennas described herein each have only one element, it would be possible to substitute an array of elements.

The antenna may be mounted in various ways. For example, the base member 14 may be mounted upon the roof of an automobile or boat. Because it is so compact, in the case of trucks, the antenna could be mounted upon a mast so that it is not overshadowed. An advantage of antennas embodying the present invention is that the mass of the antenna element 10 and its supporting components may be relatively low, thereby reducing the risk of damage caused by inertial forces.

It will be appreciated that the support arm components could be formed integrally with the platform member, perhaps as a die casting.

While the specific embodiments described herein would be attached to an existing vehicle, it is envisaged that embodiments of the invention could be integral, being installed during manufacture. This could lead to further savings since the base member, for example, could be a structural part of the vehicle, such as its roof.

A further concern with antennas for use with vehicles is inertia associated with acceleration and deceleration producing mechanical stresses which reduce the reliability. An advantage of embodiments of the present invention is the low mass of the components.

The design readily lends itself to fabrication of many of the parts using plastics which will further reduce weight and increase durability.

Although embodiments of the invention have been described and illustrated in detail, it is to be clearly understood that the same is by way of illustration and example only and is not to be taken by way of the limitation, the spirit and scope of the present invention being limited only by the appended claims

What is claimed is:

1. A mechanically steerable antenna comprising a support member mounted upon a base member and an antenna element means mounted upon the support member, the antenna element means being rotatable relative to the support member about a first axis of rotation and the support member being rotatable relative to the base member about a second axis of rotation, the first axis and the second axis being mutually inclined by a predetermined angle, the antenna further comprising drive means for rotating of the support member relative to the base member, and flexible coupling means interconnecting the base member and the antenna element means, the arrangement being such that, upon relative rotation of the support member relative to the base member, the flexible coupling means causes rotation of the antenna element means relative to the support member, wherein the flexible coupling means comprises a tubular cylindrical torsion spring and a feedline in the form of a coaxial cable that is connected at one end to the antenna element means and passes through the flexible coupling means.

2. A mechanically steerable antenna comprising a support member mounted upon a base member and antenna element means mounted upon the support member, the antenna element means being coupled to the support member by a first bearing means for rotation relative to the support member about a first axis of rotation and the support member being coupled to the base member by a second bearing means for rotation relative to the base member about a second axis of rotation, the first axis and second axis being mutually inclined by a predetermined angle, the antenna further comprising drive means for rotating the support member relative to and the base member, and a flexible coupling means interconnecting the base member and the antenna element means, the flexible coupling means comprising a feedline, the flexible coupling means being connected non-rotatably to the antenna element means and to the base member, respectively, the arrangement being such that, upon relative rotation of the support member and the base member, the flexible coupling means causes rotation of the antenna element means relative to the support member, wherein the support member extends externally of the flexible coupling means and is connected to respective outer parts of the first bearing means and the second bearing means, and the flexible coupling means extends between respective inner parts of the first bearing means and the second bearing means.

3. An antenna as claimed in claim 2, wherein the flexible coupling means is tubular and the feedline is connected at one end to the antenna element means and passes through the flexible coupling means.

4. An antenna as claimed in claim 1, wherein the flexible coupling means comprises a highly flexible co-axial cable.

5. An antenna as claimed in claim 2, wherein the antenna element means comprises a ground plane having a central recess and the first bearing means is accommodated at least partially by the central recess.

6. An antenna as claimed in claim 5, wherein the support member comprises a portion upstanding from the base member and a second portion inclined to the upstanding portion and extending into said recess.

7. An antenna as claimed in claim 2, wherein the antenna element means has a radiation pattern which is substantially symmetrical about said first axis of rotation.

8. An antenna as claimed in claim 2, wherein the antenna element means comprises a radiator element and a matching impedance interconnecting the radiator element and the feedline.

9. An antenna as claimed in claim 2, wherein the support member is carried by a flanged member having a ring gear cooperating with a drive pinion of the drive means.

10. An antenna as claimed in claim 2, wherein the flexible coupling means comprises a cylindrical torsion spring and the feedline comprises a coaxial cable.

* * * * *